Jan. 13, 1925.
M. GIVLER ET AL
1,522,510
AUTOMATIC CAMERA
Filed June 17, 1922     3 Sheets-Sheet 3
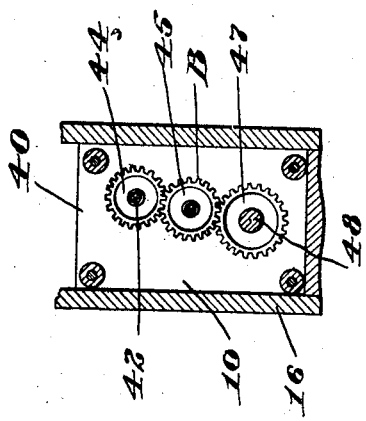
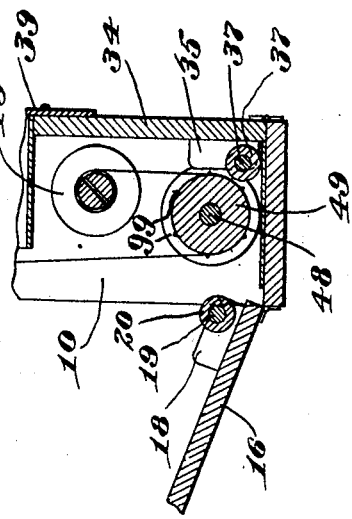
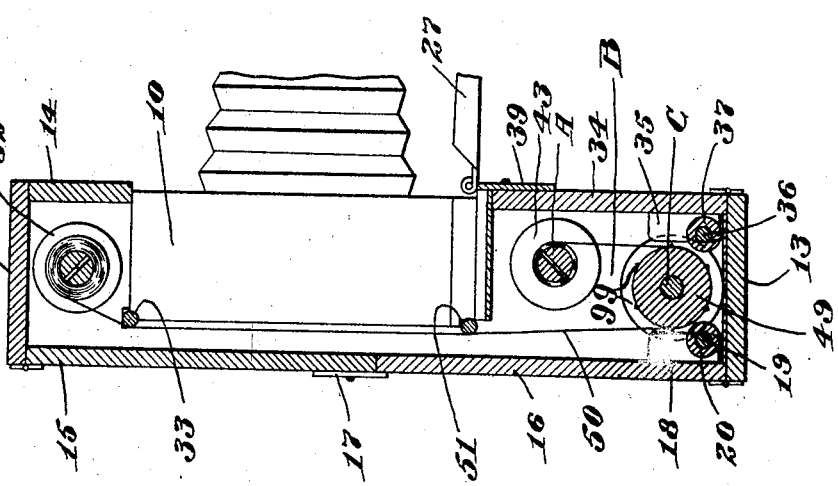
Inventors
Margaret Givler
Robert C. Givler
By James R. Hodder
Attorney Patented Jan. 13, 1925.

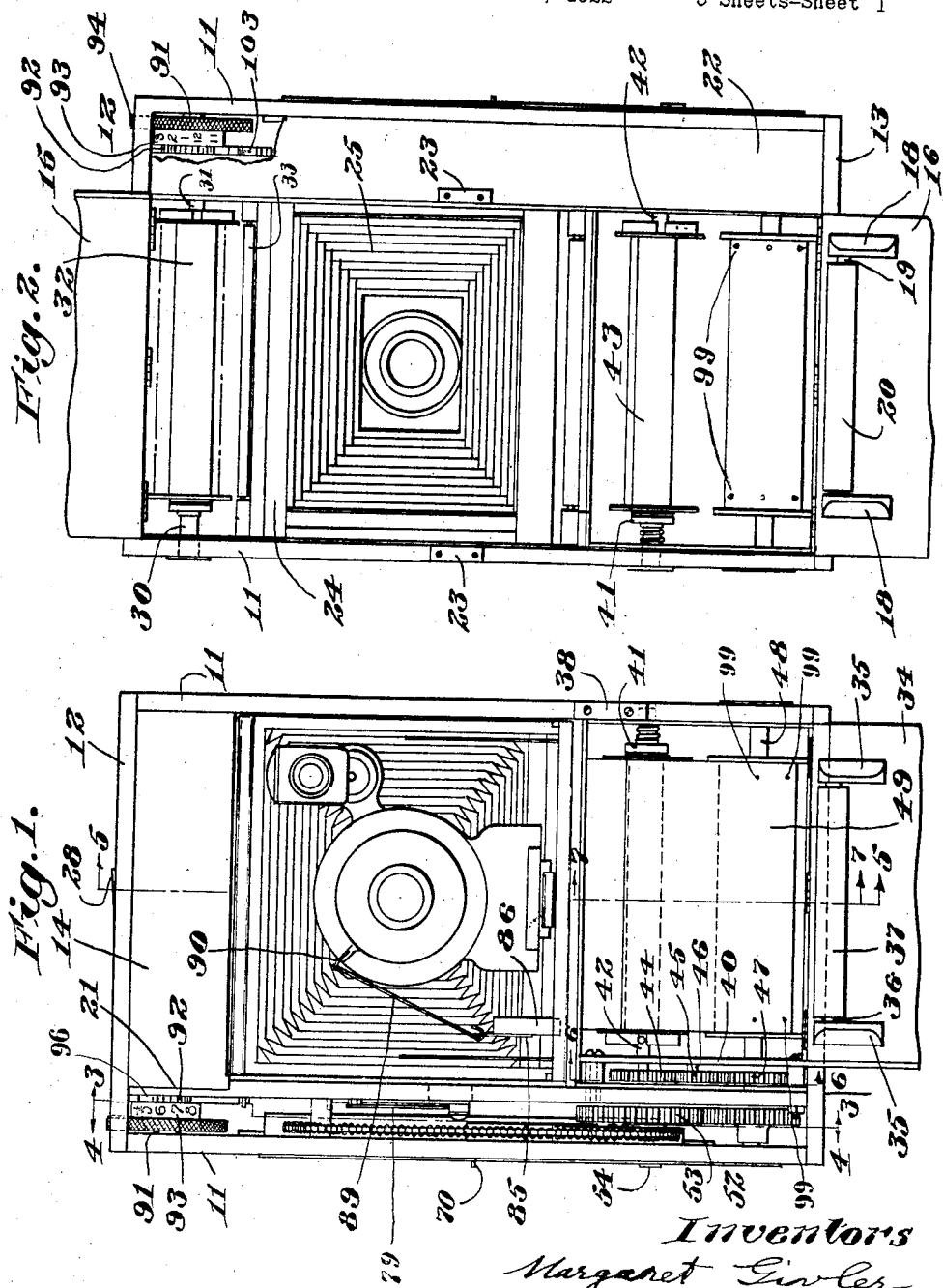

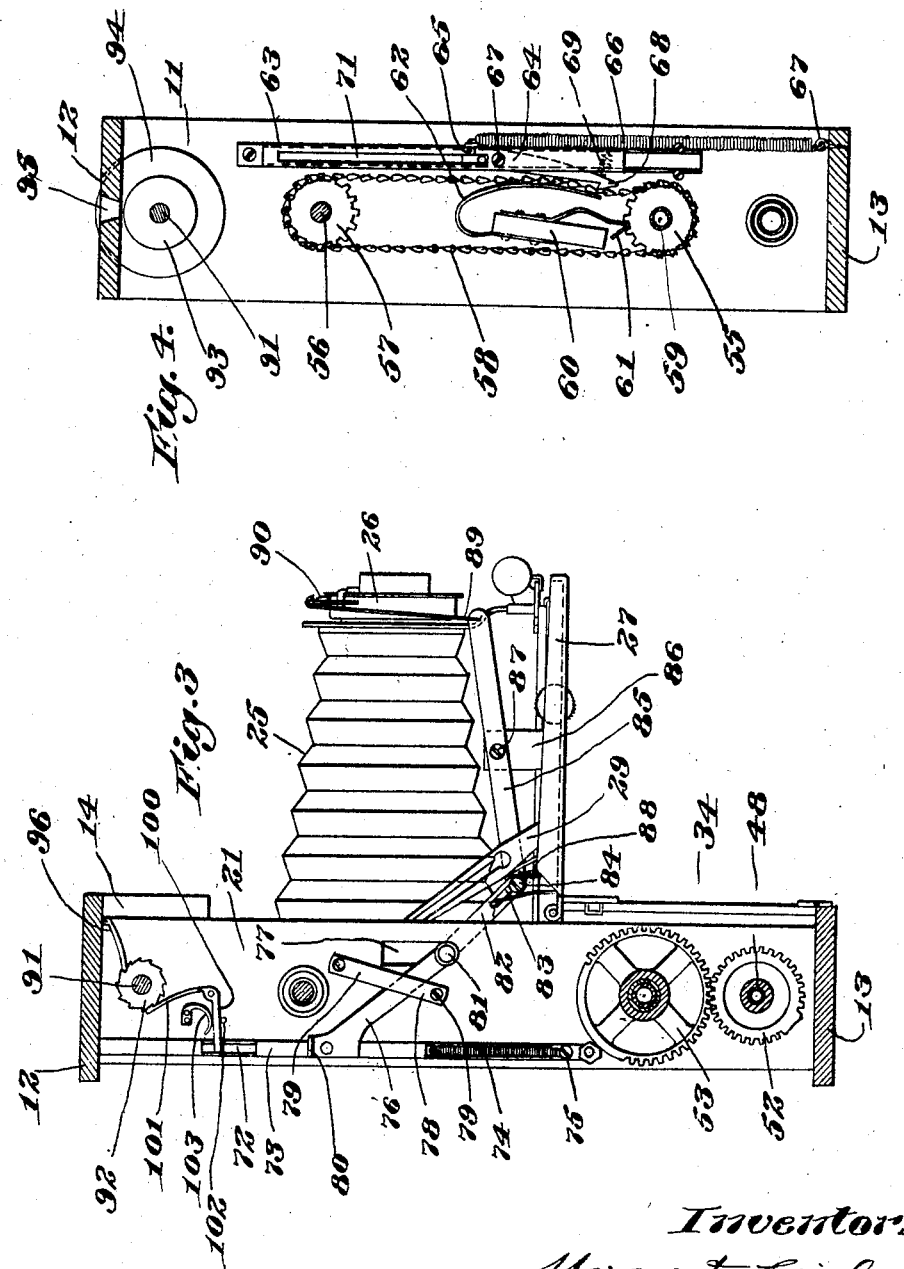

1,522,510

UNITED STATES PATENT OFFICE.

MARGARET GIVLER AND ROBERT C. GIVLER, OF CAMBRIDGE, MASSACHUSETTS.

AUTOMATIC CAMERA.

Application filed June 17, 1922. Serial No. 569,007.

*To all whom it may concern:*

Be it known that we, MARGARET GIVLER and ROBERT C. GIVLER, citizens of the United States, and residents of Cambridge, in the county of Middlesex and State of Massachusetts, have invented an Improvement in Automatic Cameras, of which the following description, in connection with the accompanying drawings, is a specification, like letters on the drawings representing like parts.

Our present invention relates to cameras, and more particularly to an improved automatic folding camera.

In prior apparatus of the type to which the present invention particularly relates, two principal aims have been manifest:—First, to combine in one operation the advancement of the film and the actuation of the shutter, and second, to prevent, by the aforesaid combination of the film-advancing and shutter-actuating means, a second exposure of the same portion of the film lying in the focal plane of the lens. For the realization of these aims various mechanical combinations have been devised, none of which have been successful either practically or commercially, on account of the following defects which they exhibit:

While the use of springs or their equivalents as a driving mechanism may, in the main, operate to produce the desired results, they cannot be depended upon at all times to act positively or with equal speed and traction either to advance the film or to actuate the shutter.

The use of a film especially punctured at regularly spaced intervals, such punctures to be employed to catch and operate a cam or detent which periodically operates the shutter mechanism. Such a device not only necessitates the use of a specially prepared film, but, inasmuch as such film is punctured on one margin only, it is inevitable that the film will be pulled out of its alinement in the focal plane of the lens while it is effectively operating the pawl or detent. Moreover, such a punctured film will easily tear, or, on account of its inherent weakness as a cause of the motion of metal parts, it will frequently fail to actuate the shutter mechanism at all.

The use of a lever operating a train of spur gears, such lever so pivoted with respect to the body and main axis of the camera as to put the camera out of alinement with regard to the object being photographed when the lever is operated. Such use of a lever so disposed with respect to the main axis of the camera hinders the operation of the camera under any but the most carefully prevised conditions.

Further, the use of a different length of stroke to operate the mechanism for controlling the amount of film to be fed from a supply spool of continually decreasing diameter onto a take-up spool of an ever increasing diameter. Obviously all such attempts to provide a differential mechanism for the regulation of the advancement of the film cannot be called either positive or automatic.

The use of a separate and distinct means for the advancement of the film and the actuation of the shutter, one of such means being inaccessible to the operator while the other one is being employed.

In our present improved apparatus all of the above defects are done away with. The use of springs as a driving mechanism is obviated, springs being employed only in the minor capacity of returning the lightest moving parts to positions of rest. Neither do we employ any specially punctured film, since our improved structure enables us to use either the ordinary six, ten, or twelve exposure film in any of the commercial sizes. Moreover, our driving mechanism is operated by positive acting means which moves in a straight line along the main axis of the body of the camera, thus reenforcing rather than interrupting the alinement of the lens of the camera with respect to the object photographed. In addition, our improved apparatus provides means whereby we can surely and positively feed a predetermined length of film into position in the focal plane of the lens regardless of the amount of film left on the supply spool or regardless of the diameter of the take-up spool as the film is fed thereto. We attain this desired result by having our film-feeding mechanism dependent upon neither the revolution nor the diameters of either the supply-spool or take-up spool, but rather upon means directly and positively operating upon the straight length of film extending between such spools. And finally, our improved device makes it possible to advance the film and to actuate the shutter by but a single straight-line motion. We can accurately and positively feed a predetermined length of film at each stroke of the operating mechanism regardless of the amount of film on either of the film spools, by means so connected to and interrelated with the shutter-actuating device that the shutter is automatically operated a predetermined length of time after an unexposed portion of the film has been brought into position in the focal plane of the lens,—both of these operations being brought about by one and the same straight line motion.

The principal object of our invention, therefore, is an improved automatic camera in which the film feeding and shutter control operations take place consecutively and with but a single motion.

Another object of our invention is an improved film feeding means for an automatic camera in which a predetermined length of film may be fed at each stroke of the operating means regardless of the amount of film that may be on the film spool.

A further object is an improved mechanism for preventing the operation of the shutter control means while an exposed section or length of film remains in the focal plane of the lens of the camera.

An improved feature of our invention is the adaptability of the same to existing cameras of the film type, it being possible to attach our invention to such cameras at a minimum of expense.

Other objects and novel features of the construction and arrangement of parts constituting our invention will appear as the description of the invention progresses.

In the accompanying drawings illustrating the preferred embodiment of our invention:

Fig. 1 is a front elevation showing the lower front apron dropped to expose the rewinding and idler rolls;

Fig. 2 is a rear elevation with both the upper and lower aprons in dropped or in open position to expose the film roll, the rewinding roll, and the idler rolls;

Fig. 3 is a vertical section on the line 3—3 of Fig. 1 and looking from the left of said Fig. 1 to the right thereof;

Fig. 4 is a vertical section on the line 3—3 of Fig. 1 and looking from the right to the left of said figure;

Fig. 5 is a vertical section on the line 5—5 of Fig. 1;

Fig. 6 is a fragmentary detail in section on the line 6—6 of Fig. 1 looking in the direction of the arrows, and Fig. 7 is a fragmentary view in section on the line 7—7 of Fig. 1.

Referring to the drawings, 10 designates a casing comprised of side members 11, top member 12, bottom member 13, and front top member 14. To the top and bottom members 12 and 13 and to the rear edges thereof respectively are hinged back cover plates 15 and 16 respectively. Blocks 18 are provided at each side of the bottom inner face of the plate 16 which act as bearings for a rotatable shaft 19 on which is secured a friction roller 20 of rubber or other suitable material, this roller being of a length substantially equal to the width of the film 50. It will be noted by reference to Fig. 2 that the plates 15 and 16 are of less width than the distance between the side members 11 and that, in alinement with a right hand edge of such plates 15 and 16 and secured top and bottom to the members 12 and 13 respectively, is a partition plate 21 that lies parallel to the side members 11. Extending from the right hand side of member 11 to the partition plate 21 is a back cover plate 22 secured to the top and bottom members 12 and 13 respectively, the right hand side 11, and the partition plate 21. There is thus defined a narrow chamber extending from top to bottom and from front to back of the case the purpose of which will be hereinafter described. We have also provided for this chamber a front cover plate which, however, has not been shown on the drawings for the sake of clearness of illustration. Latch mechanisms 17 on either side of, and near the lower outer end, of the top plate 15 cooperate with locking members 23 on the left hand member 11 and on the outer face of the member 22. Mounted intermediate the top and bottom members 12 and 13, and secured to the left hand side of member 11 and the partition plate 21, is a rectangular form 24 to the front of which is secured a collapsible bellows 25 carrying at its front end the usual lens and shutter member 26. The collapsible bellows and shutter member house within the confines of the casing above described, and at the front of the casing is pivotally mounted a cover plate 27 which may be locked in closed position by a latch 28 and is held in its fully open position by the usual side members 29.

Above the rectangular frame 24 and collapsible bellows 25, and within the casing 10 is a chamber of which the member 14 is a cover plate, and within this chamber, which is accessible from the rear of the casing by lifting the top cover 15, are spool holding members 30 and 31, the member 31 being fixed while the member 30 is a spring tension member to allow the placing of a film spool 32 in the chamber. On the rectangular frame 24 at the junction of the rear end thereof with the chamber just described, is a small metallic roller 33 over which the film may be fed from the spool 32 and across and into the focal plane of the lens of the camera. Below the rectangular frame 24 and collapsible bellows 25 is a re-wind chamber, the rear end of which is closed by the member 16 and the front end of which is closed by the hinged cover plate 34, on the lower inner face of which cover plate are formed blocks 35 in which is rotatably mounted a shaft 36 carrying roller 37 of rubber, or other suitable material, this roller being similar to the friction roller 20 mounted on the member 16. On the front of the left side member 11, and on the cover plate (not shown) on the right side member 11 are locking devices 38 which cooperate with locking devices 39 on the upper end of the hinged cover plate 34. In the re-wind chamber, adjacent to, spaced apart from, and parallel to the partition plate 21 is a plate 40 forming with the partition plate 21 a recess in which is located mechanism to be hereinafter described. In the re-wind chamber, above referred to, slidably mounted in the side wall 11 is a spring tension member 41 which cooperates with a shaft 42 which is rotatably mounted in bearings formed in the plate 40 and partition plate 21 to hold the re-wind film spool 43. Secured to the shaft 42, and within the recess formed by the plate 40 and partition plate 21, is a gear 44, which meshes with, and is driven by, an idler gear 45 mounted on a rotatable shaft 46 in said plate 40 and partition plate 21, this idler gear 45 in turn meshing with, and driven by, a gear 47, also within the recess, and secured to a shaft 48 that finds its bearings in the two side members 11. On this shaft 48 is secured a measuring roller 49 which cooperates with the rolls 20 and 37 to facilitate the feeding of the film 50 from the film spool 32 into and across the focal plane of the lens of the camera and onto the re-wind spool 43, as will be hereinafter described. Circumferentially arranged about a roller 49, at each side thereof, so as to engage with the edge of the film 50 are pins 99, these pins ensuring a positive grip on the films and therefore a positive drive thereof. On the rear lower edge of the rectangular frame 24 is rotatably mounted a roller 51 equal in length and diameter to the roller 33 and in alinement therewith.

Referring to Fig. 5, it will be seen that the film 50 is led from the film spool 32 over the rollers 33 and 51 into and across the focal plane of the lens of the camera, under the measuring roller 49, between said measuring roller and the roller 20, up between said measuring roller 49 and the roller 37, and onto the re-wind film spool 43.

Secured to the shaft 48, and within the narrow chamber defined by the side member 11 and partition plate 21 is an intermittent gear 52 which meshes with, and is driven by, a second intermittent gear 53 secured to a shaft 59 rotatably mounted in bearings formed in the side member 11 and partition plate 21. To the end of this shaft, and on the exterior of the side plate 11 is formed an indicating hand 54 provided for the purpose of indicating to the operator of the camera the amount of travel or rotation of the gear 53. Secured to the shaft on which is mounted the intermittent gear 53 is a sprocket wheel 55. Near the upper end of the narrow chamber defined by the side wall 11 and the partition plate 21 is rotatably mounted a shaft 56 to which is secured a sprocket wheel 57 equal in diameter and pitch to, and in alinement with, the sprocket wheel 55, and over the sprocket wheels 55 and 57 runs a sprocket chain 58. Secured to the interior face of the side wall 11 and between the shafts 56 and 59 and the straight reaches of the sprocket chain 58 is a bar 60, to one face of which is secured a spring pawl 61 which meshes with the teeth of the ratchet 55, while to the other face of this bar 60 is secured a spring 62, this spring 62 engaging one of the straight reaches of the sprocket chain 58 and tending to force the same outwardly. Secured to the inner face of the side member 11 and lying parallel to the straight reaches of the sprocket chain 58, and adjacent one of such reaches, is a slideway 63. In this slideway is mounted a crosshead 64 from which extends a pin 65 having attached thereto one end of a coil spring 66, the other end of this spring being attached to an eye 67, secured to the bottom member 13, this spring 66 tending to force the crosshead and attached parts to its lowermost position as shown particularly in Fig. 4. Pivotally mounted on the crosshead 64 by the screw 67 is a hook 68 which is spring pressed by means of the spring 69 into engagement with the one of the reaches of the sprocket chain 58 that is in engagement with the spring 62. The distance between the shafts 56 and 59 is so proportioned that, when the hook 68 in its lowermost position engages the sprocket chain 58, approximately seven-eighths of the full stroke in the slide 63 of the crosshead 64 will be sufficient to move an exposed length of film 50 out of the focal plane of the lens of the camera and onto the re-wind film spool 43 and simultaneously move a fresh unexposed length of film into such focal plane. The toothless portions of the intermittent gears 52 and 53 coming into action at this particular point in the stroke of the crosshead 64 prevents overthrow of the film 50 and the remainder of the stroke of the crosshead is utilized to effect operation of the shutter of the camera. The spring 62 tending always to force the straight reach of the sprocket chain 58 against the hook 68 insures positive action between said hook 68 and the sprocket chain 58 at the lowermost position of such hook.

Secured to the crosshead 64 is an operating member or handle 70 which extends through a vertical slot 71 in the side plate 11 and in position to be clasped by the thumb or by the thumb and forefinger of the operator.

Lying parallel to the slide 63, but secured to the partition plate 21 is a slideway 72 in which is slidably mounted the crosshead 73 to the lower end of which is secured one end of a coil spring 74, the other end of this spring being secured to the bottom of the slideway by the screw 75. Secured to the crosshead 73 is an arm 76 which lies at an angle with the crosshead 73, and its lower end extends to a point adjacent a rectangular slot 77 formed in said partition plate 21, and a plate 78 secured to the partition plate 21 by screws 79 preventing lateral movement of said arm 76 with respect to said plate. The upper end of the arm 76 is bent laterally at 80 with respect to the main portion of said arm and this extension 80 lies in the path of movement of the pivot screw 67 and the crosshead 64, the pivot screw 67 engaging with said extension 80 when the film feeding movement has been completed. A pin 81 secured to the lower end of the arm 76 extends through the slot 77 and has pivotally mounted thereon one end of a link 82, the lower end of this link being slotted at 83 to receive a pivot 84 on one end of a lever 85, which lever 85 is pivotally mounted on a post 86 on the cover 27 by means of a screw 87, a spring 88 secured at one end to the aforesaid end of the lever 85, and the other end to the cover plate 27, acting to hold such end downward adjacent said cover plate. To the other end of the lever 85 is pivotally secured the lower end of a link 89, the upper end of this link being pivotally connected to the outer, or free, end of the shutter operating lever 90.

As a substitute for the usual exposure indicator of the ordinary film camera, we use the mechanism illustrated in Figs. 1, 2, 3, and 4. This mechanism comprises a shaft 91 rotatably mounted in bearings in the side member 11 and partition plate 21 and on this shaft 91 is secured a ratchet wheel 92, an indicating wheel 93 and a knurled adjusting wheel 94. On the periphery of the indicating wheel 93 are engraved numerals—usually 1 to 12—which are equal to the number of exposures on the longest commercial films. These numerals may be brought into alinement with an opening 95 in the top plate 12, and enable the operator to see how many films have been exposed. The knurled adjusting wheel 94 extends through the top plate 12 so as to enable the operator to rotate the same to set the indicating wheel 93 to any numeral desired. Secured to the plate 14 in any convenient manner is a spring retaining pawl 96, the free end of which engages with and prevents reverse rotation of the shaft 91 and therefore the indicating wheel 93. Pivotally mounted on the partition plate 21 is a bell crank lever, one arm 100 of which extends into the path of movement of the crosshead 73 in the slideway 72, and the other arm 101 engages with the ratchet wheel 92 and acts as a pawl. A pin 102 secured to the partition plate 21 limits the downward movement of the arm 100, while a spring 103 riveted to the plate 21 ensures the return of the arm 100 to engagement with the pin 102.

The film 50 having been carried over the rollers 33 and 51 from the film spool 32 around the idler roller 49 and onto the rewind spool 43, and the camera being open, as shown in Fig. 3 in position ready to take pictures, the operating handle 70 is moved upward in a series of short steps until the first length of unexposed film is in position to be drawn into the focal plane of the lens of the camera.

As the film 50 is fed around the idler roller 49, the pins 99 perforate the edges of such film, ensuring a positive feed thereof. It will be noted, by reference to Fig. 5, that the rollers 20 and 37 are not in engagement with the idler roller 49 and yet they are so associated therewith as to ensure the forcing of the pins 99 through the film 50. The operator, after focusing the camera and operating the handle, at this time assumed to be in its lowermost position, moves said operating handle upwardly with respect to the camera whereupon the hook 68, engaging the straight reach of the sprocket chain 58, rotates the shaft 59, and therefore the intermittent gears 52 and 53, the gears 47, 45, and 42, and moves No. 1 length of the unexposed film into the focal plane of the lens of the camera.

The operator now operates the knurled wheel 94 to bring numeral 1 on the periphery of the indicating wheel 93 opposite the perforation 95 in top plate 12. At the termination of this feeding movement, the screw 67 engaging with the projection 80 of the arm 76, moves the lower end of said arm upward parallel to the slot 77, pulling the hook 82 therewith and the lower end of the slot 83 in said link engaging with the pivot 84 on one end of the lever 85, moves such end upward and the other end downward, pulling on the link 89 and downward on the shutter lever 90, causing the operation of the shutter and the exposure of the film.

As the crosshead 73 moves upward in the slideway 72 it engages the end of the arm 102 of the pivotally mounted bell crank lever, rotating said lever about its pivot point and pulling the other arm 103 downward, rotating the ratchet wheel, through the space of one tooth and bringing numeral 2 on the periphery of the indicating wheel 93 opposite the perforation 95 in the top plate 12. The operating handle is now released whereupon the spring 66 returns the crosshead 64 and all attached parts to their lowermost position as shown in Fig. 4, and the spring 74 moves the crosshead 73, and therefore the arm 76 and associated parts, to their lowermost position as indicated in Fig. 3. This operation may be repeated indefinitely, as it will be noted that the operation of the shutter does not take place until after the placing in position of an unexposed length of film and, as such operations are positive and do not depend upon springs or the equivalent thereof, there is no danger of double exposure. After the series of short steps to position the film, as above described, the position of the indicating hand 54 is noted by the operator and this position is used as a check on the accuracy of the operating parts of the mechanism above described. The further operation being automatic, a complete stroke of the crosshead 64 causes a complete rotation of the shaft 59. This latter is merely an additional safety device, and we have found that, other than giving the operator confidence, it is not required.

While we have necessarily described the preferred embodiment of our invention, somewhat in detail, it is to be understood that we may make changes in the construction and arrangement of parts comprising our invention within wide limits without departing from the spirit of the invention.

Having thus described our invention, what we claim as new is:

1. In an automatic camera, the combination of a casing, a lens associated therewith, a shutter for said lens, operating means for the shutter, a film spool carrying a supply of unexposed film rotatably mounted in the casing at one end, a re-wind film spool rotatably mounted at the other end of said casing, and positively acting means for moving said unexposed film in predetermined lengths step by step into and across the focal plane of said lens, and means for positively controlling the operation of said shutter after the positioning of each predetermined length of unexposed film.

2. In an automatic camera, the combination of a casing, a lens associated therewith, a photographic film spool rotatably mounted at one end of said casing, a re-wind photographic film spool rotatably mounted in said casing and at the other end thereof, an endless sprocket chain connected to said re-wind spool, reciprocating gripping means for gripping said endless sprocket chain at a predetermined point, and means for reciprocating said gripping means to rotate the film re-wind spool and positively drawing a predetermined length of unexposed film from the photographic film spool into the focal plane of the lens 3. In an automatic camera, the combination of a casing, a lens associated therewith, a shutter for said lens, reciprocating means slidably mounted in said casing for positively moving a predetermined length of film into the focal plane of the lens, shutter operating means, and means on said reciprocating mechanism for engaging the shutter operating means to cause a positive operation of the shutter only after the operation of the film operating means.

4. In an automatic camera, the combination of a lens and a positive photographic film feeding mechanism including a film re-wind spool, a rotatably mounted shaft, an intermittent gear secured thereto, a second rotatably mounted shaft, an intermittent gear secured thereto, and meshing with the first said intermittent gear, an idler feed roll and a gear also mounted on said second shaft, a gear associated with the re-wind film roll, and means for rotating the first said intermittent shaft a predetermined amount to rotate the second intermittent shaft, the gear secured to the shaft on which said intermittent gear is mounted and the gear associated with the re-wind film spool to rotate the re-wind film spool a predetermined amount depending on the length of film fed from the film holding spool.

5. In an automatic camera, the combination of a lens and a positive photographic film feeding mechanism including a film re-wind spool, a rotatably mounted shaft, an intermittent gear secured thereto, a second rotatably mounted shaft, an intermittent gear secured thereto and meshing with the first said intermittent gear, an idler feed roll and a gear also mounted on said second shaft, a gear associated with the re-wind film roll, and means for rotating said film re-wind spool an amount depending on the length of film to be re-wound and independent of the varying diameter of the re-wind spool plus any film that may be wound thereon.

6. In an automatic camera, the combination of a lens and a positive photographic film feeding mechanism including a film re-wind spool, a rotatably mounted shaft, an intermittent gear secured thereto, a second rotatably mounted shaft, an intermittent gear secured thereto and meshing with the first said intermittent gear, an idler feed roll and a gear also mounted on said second shaft, a gear associated with the re-wind film roll, a sprocket wheel secured to the shaft on which the first said intermittent gear is secured, a second sprocket wheel rotatably mounted and spaced apart from the first said sprocket wheel to be operated on and providing a straight stretch or reach of sprocket chain dependent on the length of film to be operated on, a spring associated with said straight reach of sprocket chain, a reciprocating crosshead, a catch pivotally mounted in said crosshead, and engaging the sprocket chain on the opposite side of said spring, and means for positively operating the crosshead whereby the catch engages the sprocket chain to rotate the gears and cause a rotation of the re-wind spool an amount independent of the diameter of such spool and dependent only on the length of the stroke of the cross-head.

7. In an improved automatic camera, the combination of a casing, a lens associated therewith, a photographic film spool rotatably mounted in said casing and in the upper end thereof, a film re-wind spool rotatably mounted in said casing and in the lower end thereof and parallel to the photographic film spool, means for simultaneously rotating the film spool and the re-wind spool to bring a predetermined length of unexposed film into the focal plane of the lens, a shutter for said lens, and means for positively operating the shutter and only after the unexposed length of film has been positioned.

In testimony whereof, we have signed our names to this specification.

MARGARET GIVLER.
ROBERT C. GIVLER.